United States Patent [19]

Tucker

[11] 4,158,856
[45] Jun. 19, 1979

[54] APPARATUS AND METHOD FOR GENERATING DIGITAL WORDS REPRESENTATIVE OF VIDEO INFORMATION

[75] Inventor: Billy J. Tucker, Skillman, N.J.
[73] Assignee: Sangamo Weston, Inc., Norcross, Ga.
[21] Appl. No.: 797,953
[22] Filed: May 18, 1977
[51] Int. Cl.² .............................................. H04N 7/12
[52] U.S. Cl. .................................... 358/133; 358/138
[58] Field of Search ............... 358/133, 135, 138, 105, 358/106, 107, 260, 263

[56] References Cited
U.S. PATENT DOCUMENTS
3,980,809  9/1976  Cook ...................................... 358/260

Primary Examiner—Richard Murray
Attorney, Agent, or Firm—William R. Sherman; Martin M. Novack

[57] ABSTRACT

A technique for converting video information into sequences of digital words in a form which can be readily accepted by a computer. The generated digital words exclude some information content of the video signals which is not necessary for certain pattern recognition and control purposes. In accordance with the preferred embodiment of the invention, there is provided a clock having a rate which is in synchronism with the video line and field information. A comparator is provided for comparing the video signals to a prescribed standard and for generating digital indications as a function of the comparisons. Each digital indication is preferably a binary bit which indicates whether the compared video signal is above or below the prescribed threshold. Means, synchronized with the clock rate, are provided for serially accumulating a predetermined number of successive digital indications. Finally, means are provided for reading out each group of accumulated digital indications. In an embodiment of the invention, means are provided for detecting the nature of digital indications over a given period, for example one field. The detected value is then used for modifying the prescribed standard.

18 Claims, 2 Drawing Figures

APPARATUS AND METHOD FOR GENERATING DIGITAL WORDS REPRESENTATIVE OF VIDEO INFORMATION

BACKGROUND OF THE INVENTION

This invention relates to the conversion of video information into a form suitable for storage in a computer and, more particularly, to an apparatus and method for generating sequences of digital words representative of fields of video information.

Computer technology and television technology have both experienced great advances in recent years. However, there has been limited progress in joining computers and television due to the dissimilarity of their data rates. A television camera generates information at a tremendous rate; i.e., millions of scanned elemental areas or points per second, with the information at each point typically having an amplitude or brightness level that is representable by one of many levels or possible values. A typical television frame consists of spatial and intensity information which is in a format of hundreds of distinguishable points per line and hundreds of lines per frame. There are generally 30 frames per second for U.S. television format. The enormous amounts of video data would quickly saturate the conventional memory of most computers. Also, digital machines are generally incapable of receiving the information in memory in "real time" due to the high data rate.

The data format emanating from conventional television camera equipment is a further impediment to covenient computer storage of the information. The video information is typically in a rapidly varying analog form. On the other hand, most digital computers are designed for loading with digital words of eight or sixteen bits of information, and can accept these data words at a rate of about one word every one to three microseconds.

It is an object of the present invention to provide a technique for generating digital words from a video signal, the digital words being compatible with conventional computer formats and also being of a nature which can be readily accepted in real time by relatively small computers or other digital equipment. It is a further object of the present invention to provide a technique for converting video information into sequences of digital words which exclude portions of redundant information inherent in the video signal and can be adapted for pattern recognition, decision making, and control purposes.

SUMMARY OF THE INVENTION

Applicant has devised a novel technique for converting video information into sequences of digital words in a form which can be readily accepted by a computer. The generated digital words exclude some information content of the video signals which is not necessary for certain pattern recognition and control purposes. For example, the present technique is applicable, inter alia, to the type of system set forth in the copending U.S. Patent Application Ser. No. 624,142 filed Oct. 20, 1975 and assigned to the same assignee as the present invention.

The present invention is particularly applicable for use in conjunction with a video signal generating apparatus such as a television camera, which produces analog video signals in the form of fields of scanlines. In accordance with the preferred embodiment of the invention, there is provided a clock means having a rate which is in synchronism with the video line and field information. This synchronism typically, but not necessarily, results from the use of the clock means for generating timing signals from which the vertical and horizontal sweep signals for the television camera are derived. Means are provided for comparing the video signals to a prescribed standard and for generating digital indications as a function of the comparisons. Each digital indication is preferably, but not necessarily, a binary bit which indicates whether the compared video signal is above or below the prescribed standard. If desired, however, the digital indication could comprise two or more bits which convey further information about the comparison. Further means, synchronized with the clock rate, are provided for serially accumulating a predetermined number of successive digital indications. This accumulating means preferably comprises an N-bit serial-in-parallel-out shift register, for example a 16-bit shift register, into which the digital indications are clocked, and a counter which determines when the predetermined number (N) of successive digital indications have been clocked into the shift register. Finally, means are provided for reading out each group of accumulated digital indications. The read out means may comprise output lines coupled to the output terminals of the shift register, but preferably is a parallel-in-parallel-out buffer register.

In an embodiment of the invention means are provided for detecting the nature of the digital indications over a given period, for example one field. The detected value is then used for modifying the prescribed standard.

Further features and advantages of the invention will become more readily apparent from the following detailed description when taken in conjunction with the accompanying drawings.

DESCRIPTION OF THE PREFERRED EMBODIMENT

Figure 1:
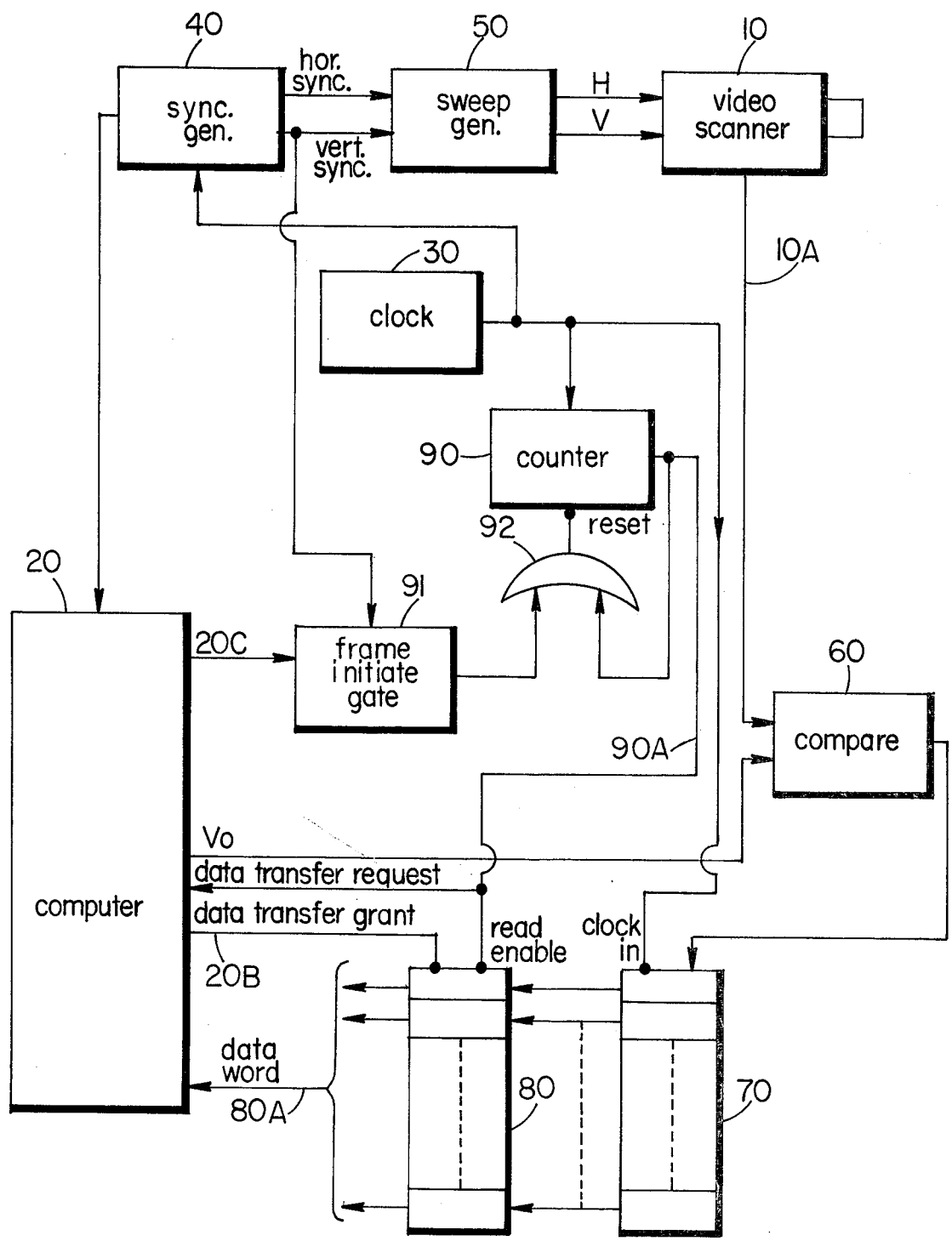
FIG. 1 is a block diagram of an apparatus in accordance with an embodiment of the invention.

Referring to FIG. 1, there is shown an embodiment of the invention as used in conjunction with a video scanner 10 and a computer 20. The invention is not limited to receiving video signals from any particular type of video signal generating means, nor is it limited to generating digital data words for receipt by any particular computer or other digital system. However, for exemplary purposes, the video scanner may be a model TN-2000 Scanner manufactured by General Electric Co. and used in conjunction with apparatus as set forth in the above-referenced copending U.S. Application Ser. No. 624,142. The computer may be for example a "microNOVA" manufactured by Data General Corp. A clock 30 is provided, and has a clocking rate of 491.52 KHz in the present embodiment, although any suitable clock frequency can be employed. The clock 30 may alternatively be derived from the clock of computer 20 or from a clock associated with video scanner 10. The clock signals should, however, be synchronized with the video scanner and with the novel data converter portion of the present invention. In the present embodiment, synchronization of the clock with the video scanner is achieved via sync generator 40 and sweep generator 50. The sync generator 40 generates a horizontal sync signal at a desired line rate, and a vertical sync signal at a video field rate. In the present embodiment, the line rate is 3.84 KHz and the field rate is 30 Hz, but these values are a matter of design choice. The frame rate in the present embodiment corresponds to the field rate but it will become understood that the invention is equally applicable to systems which utilize two or more interlaced fields per frame. The term "field", as used herein, is intended to be generic to "frame" in situations where a frame of two or more fields of video information is to be stored. The 3.84 KHz horizontal sync signal is readily derived by dividing the clock rate by 128, this meaning that there will be 128 clock pulses or elemental units per video scanline. The vertical sync signal can, in turn, be obtained by dividing the line rate by 128, there being 128 lines per field (or frame) in the present embodiment. The sweep generator circuit 50 receives the horizontal and vertical sync signals and generates vertical and horizontal sweep signals which are typically applied to the deflection or element selection media of the video scanner. Sync generating circuits and sweep generating circuits are well known in the art and will not be described further herein.

The video scanner 10 typically scans a scene and generates video signals having an amplitude which varies with the brightness of a particular elemental unit or "pixel" that is instantaneously being scanned. The video scanner 10 includes video processing circuitry which, again, is well known in the television art and will not be described further herein. The video signals generated by scanner 10 are coupled to one input of a comparator 60. The other input to comparator 60 is a standard or threshold voltage level $V_0$ on a line 20A. This threshold level may be fixed or manually variable but, preferably, as in the present embodiment, is a dynamic signal which can be modified during different fields by computer 20 depending upon the video content of previously scanned fields of information. The comparator 60 is operative to continuously compare the video signals to the threshold level $V_0$ and to produce an output, at a logical "1" level, when the threshold level is exceeded, and an output at a logical "0" level when the threshold level is not exceeded. This binary output of comparator 60 is coupled to the input of a serial-in-parallel-out shift register 70 which is clocked at the basic clock rate by pulses from the clock 30 on a line 30A. Accordingly, the video signal is effectively sampled at the clock rate, each sample value that is stored in shift register 70 reflecting the result of the comparison for that sample with the threshold level. It will be understood that while it is necessary to synchronize the sampling with the basic clock rate, sampling need not occur at the clock rate (although it does in the present embodiment), but may be at a frequency which is related to the clock rate. Also, the comparing and sampling operations are considered herein as being integral to each other. It will thus be clear that the sampling function could alternatively be performed prior to the comparison function. In such case one would generate analog or digital samples at a level which reflects the video level, and then compare each sample to the threshold level. In this same context, it will be understood that the comparator could, if desired, alternatively be of the type which requires an enabling signal, and the enable signal could be derived from the clock 30 so that sampling would be effected at the comparator 60.

In the present embodiment, the sixteen stages of shift register 70 are coupled to respective ones of a sixteen bit latch 80 which serves as a buffer. The latch 80 is enabled to read in the contents of the shift register 70 upon the occurrence of a signal on a line 90A. The line 90A carries the output of a counter 90 which, in the present embodiment, is a count-to-16 counter. The counter 90 receives clock pulses from clock 30 and generates an output on line 90A after each occurrence of sixteen successive clock pulses. The counter 90 has its output coupled to its reset terminal via OR gate 92. The other input to OR gate 92 is a signal from a frame initiate gate 91. The gate 91, which may comprise J-K flip-flops, receives a "frame initiate" signal from the computer on line 20C and then generates an output upon the next occurrence of the frame sync signal.

The output of counter 90 is also coupled to the computer 20 and serves as a "data transfer request" signal to the computer. A responsive signal issued by computer 20 on line 20B, and designated as a "data transfer grant" enables the sixteen bit data word in buffer 80 to be read into the computer. It will be understood, however, that the data word in the buffer 80 could, if desired, be read into a memory or recorded on storage media without the need for a data transfer request signal and a data transfer grant signal.

In operation, the video scanner 10 scans a scene at a frame (and field) rate of 30 Hz, and a line rate of 3.84 KHz, these signals being synchronized with the 491.52 KHz rate of clock 30. When the computer 20 wants to receive a frame of video information, it issues a frame initiate signal which causes resetting of the counter 90 at the beginning of the next frame of video scanner 10. Counter 90 now begins counting a cycle of sixteen clock pulses. The generated video signal on line 10A is received by comparator 60 and continuously compared to the threshold level $V_0$, so the output of the comparator is a two level (binary) signal which continuously indicates whether or not the video output signal is above the threshold level. At each clock pulse from clock 30, the shift register 70 is clocked. In other words, during each clock pulse from clock 30 a new bit of information is serially input to the shift register 70, the serially stored information indicating whether or not the video signal was above threshold during each particular clock period. After sixteen clock pulses, the shift register 70 is full and, also, the counter 90 produces an output signal on the line 90A. The signal on line 90A serves as an enable for the latch 80 to receive in parallel and store the sixteen bits of information from the shift register 70. The signal on line 90A is also coupled to the computer and serves as a "data transfer request" signal; i.e., it indicates to the computer that there is a sixteen bit data word waiting in the buffer 80 for transfer to the computer. During the next sixteen clock pulses the shift register 70 is again filled with sixteen new bits of information. At a frequency of 491.52 KHz, this takes about thirty-two microseconds, so the computer has this much time to receive the previous sixteen bit word from the buffer 80 before the buffer obtains the next sixteen bit word. (It should be noted that even at a ten times higher frequency, e.g. about a 5 MHz sampling frequency which could characterize a 500 element, 500 line, 30 frame television system (approximating commercial home television) there would be allowed about 3 microseconds for transfer of a sixteen bit word to a computer.) While the next sixteen bit word is being clocked into the shift register 70, the computer issues a "data transfer grant" signal on a line 20B which enables transfer of the previous sixteen bit data word into the computer, as represented by the lines 80A. The described operation of generating binary bits for each elemental "sample" of the video signal, serially accumulating an N-bit word, and reading the word out in parallel to the computer, continues for an entire video frame. The information stored in the computer accordingly represents a full frame of video information in a binary format that is useful in applications such as pattern recognition, automatic inspection, etc. At the end of a video frame, there have been generated and stored 1028 sixteen bit binary words; i.e., 8 sixteen bit words per line (equivalent to 128 elements per line) and 128 lines per frame.

It is seen that in the embodiment of FIG. 1, operation is in a mode wherein scanning can continue (with the video signal being used, for example, for other purposes) without input information being fed to the computer. If desired, however, the sync generator could be triggered by the computer so that the video scanner would only operate when the computer requires a frame of information. It will also be understood that while the frequencies in the illustrative embodiment have been selected such that an even number of binary words occurs per scanline, the system can operate equally well if, for example, the last word in each scanline has less than N (16 in this case) bits. In such case, the counter 90 can be enabled at the beginning of each scanline, so only the last digital word in a line will be cut off short (e.g., with some extraneous zeros on the end). In this same context, it will be understood that the illustrated embodiment includes storage of information during vertical and horizontal flyback. During these periods no image information will be stored, but in some systems these periods are used to convey coded information, so it may be useful to store the entire frame including blanking periods. However, if desired, to minimize memory requirements, signals indicating the beginning and end of active video periods can be used to gate the counter 90 on and off.

In accordance with a feature of the invention, the threshold level on line 20A is dynamic and subject to modification when the information stored for a given frame of video information does not meet a preselected criterion. For example, if the stored video frame includes less "1"'s than expected (typically in a situation where the type of part or pattern in a scanned scene is generally known), this indicates that the threshold is set too high and an automatic adjustment of the threshold, by a prescribed increment, is made. An alternate criterion for adjusting the threshold is the amount of "detail" in the frame, as represented by the number of "0" to "1" transitions in the stored digital words. Again, if there is insufficient detail in the frame, the threshold may be too high and it is automatically lowered by an increment. Conversely, if there is too much detail, the threshold may be too low with noise being interpreted as signal; this condition indicating that the threshold level should be increased. The subsystem for making this determination may be implemented in either hardware or software form, the flow chart associated with a software implementation being set forth in FIG. 2. It will be understood, however, that a hardware substitute could readily be implemented by counting the number of "1"'s or "0" to "1" transitions in a frame, comparing the result to a prescribed standard, and modifying the threshold upward or downward by an increment depending upon whether the standard is met.

Figure 2:
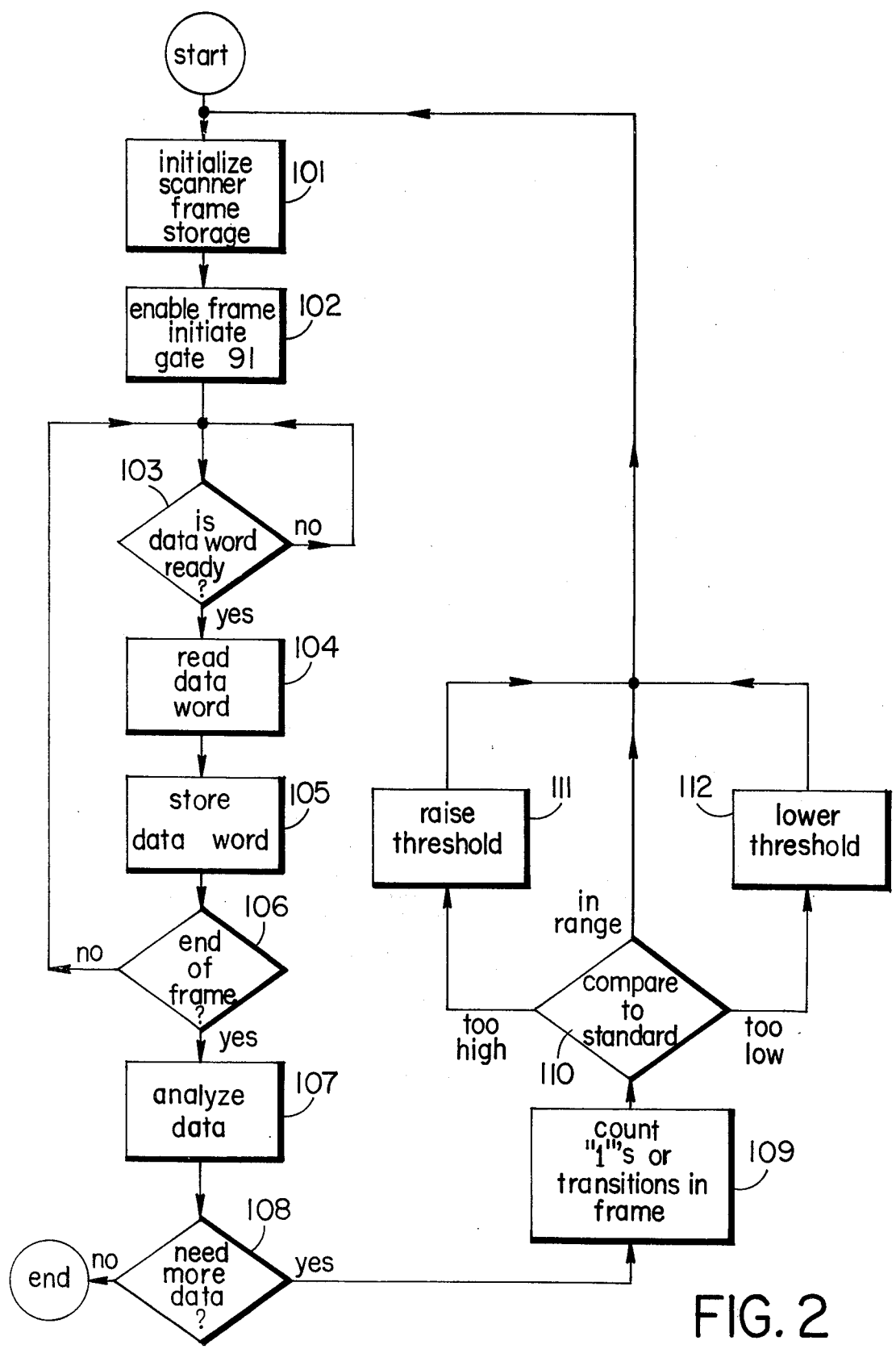
FIG. 2 is a flow chart suitable for implementing the general purpose computer 20 of FIG. 1 to perform functions compatible with the invention.

Referring to FIG. 2, there is shown a simplified flow diagram suitable for programming a general purpose computer to operate in conjunction with the conversion technique and apparatus of the present invention and to implement the dynamic threshold feature thereof. When it is desired to receive and store a frame of video information, scanner frame storage is first initialized, as indicated by the block 101. This represents allocation of particular memory designation in the computer in which the frame of video information is to be stored. The frame initiate gate 91 (FIG. 1—line 21C) is then enabled, as represented by the block 102. As described in conjunction with FIG. 1, enablement of the frame initiate gate 91 resets the counter 90 as soon as the next frame sync signal occurs indicating the beginning of a new video frame. Inquiry is then made as to whether a data word is ready; i.e., as to whether a signal has just occurred on the data transfer request line 90A (FIG. 1). This function is represented by the diamond 103. If not, the input to diamond 103 is reentered so that the inquiry is continuously made until the data transfer request signal actually occurs. When it does, the block 104 is entered and the data word is read, this being effected by issuance of a data transfer grant signal on line 20B (FIG. 1). The received data word is stored, as represented by the block 105, and decision diamond 106 is entered for inquiry as to whether it is the end of a frame, as would be indicated by the signal coupled from the sync generator 40 to computer 20. If not, diamond 103 is reentered to await the next data word. If it is the end of a frame, block 107 is entered, this block representing the analysis of the received data by the computer. This analysis will, of course, depend upon the particular application of the overall system which may be, for example, a pattern recognition, parts inspection, or control function. Based on this analysis, the computer determines whether more data is needed, as represented by the decision diamond 108. If no more data is needed at this time, the routine is ended. If more data is necessary, adjustment of the threshold level, $V_0$, is performed as represented by the blocks 109–112, and the block 101 is then reentered so that another frame of video information can be stored. The block 109 represents the counting of "1"'s or "0" to "1" transitions in the frame which was just stored. The count is compared to a predetermined standard, as represented by the diamond 110. If the count is within a predetermined standard range, no modification of the threshold level is effected. If the count is below the standard range, the threshold is set too high and it is lowered, as represented by the block 112. Conversely, if the count is above the standard range, the threshold is indicated as being too low, and it is raised, as represented by the block 111.

The invention has been described with reference to particular embodiments, but variations within the spirit and scope of the invention will occur to those skilled in the art. For example, it will be understood that the invention is applicable to various types of video raster patterns and that the equipment for receiving the converted digital words in parallel can be any suitable utilization equipment.

I claim:

1. Apparatus for generating sequences of digital words representative of fields of video information, comprising:

clock means;

means for generating video signals which represent a field of scanlines which are in synchronism with the rate of said clock;

means for comparing, at the clock rate, the video signal level with a reference level, and for generating a binary bit as a function of each comparison;

means sychronized with said clock rate for serially accumulating a group of N successive binary bits; and means for reading out, in parallel and as a single N-bit digital word, each such accumulated group of binary bits.

2. Apparatus as defined by claim 1 further comprising means for detecting the nature of said binary bits over a given period of at least one field; and means responsive to said detection for modifying the reference level.

3. Apparatus as defined by claim 2 wherein said means for accumulating groups of N successive binary bits and for reading out accumulated groups of binary bits comprises a serial-in-parallel-out shift register, and counter means synchronized with the clock rate for enabling read out of said shift register.

4. Apparatus as defined by claim 3 wherein said means for reading out further comprises a parallel-in-parallel-out buffer register coupled to said shift register.

5. Apparatus as defined by claim 1 wherein said means for accumulating groups of N successive binary bits and for reading out accumulated groups of binary bits comprises a serial-in-parallel-out shift register, and counter means synchronized with the clock rate for enabling read out of said shift register.

6. Apparatus as defined by claim 5 wherein said means for reading out further comprises a parallel-in-parallel-out buffer register coupled to said shift register.

7. Apparatus as defined by claim 1 further comprising computer means for receiving the read out groups of binary bits.

8. A method for generating sequences of digital words representative of fields of video information, comprising the steps of:

generating video signals which represent a field of scanlines which are in synchronism with a clock rate;

comparing, at the clock rate, the video signal level with a reference level and generating a binary bit as a function of each comparison;

serially accumulating, at a rate synchronized with the clock rate, a group of N successive binary bits; and reading out, in parallel and as a single N-bit digital word, each such accumulated group of binary bits.

9. A method as defined by claim 8 wherein the steps of comparing, accumulating, and reading out are repeated a desired number of times.

10. A method as defined by claim 9 further comprising the steps of detecting the nature said binary bits over a given period of at least one field and modifying the reference level in response to the detection.

11. For use in conjunction with apparatus for generating video signals which represent fields of scanlines; an apparatus for generating sequences of digital words words representative of the video signals, comprising:

clock means having a rate synchronized with the scanlines of the video signals;

means for comparing, at the clock rate, the video signal level with a reference level, and for generating a binary bit as a function of each comparison;

means synchronized with said clock rate for serially accumulating a group of N successive binary bits; and means for reading out, in parallel and as a single N-bit digital word, each such accumulated group of binary bits.

12. Apparatus as defined by claim 11 further comprising means for detecting the nature of said binary bits over a given period of at least one field; and means responsive to said detection for modifying the reference level.

13. Apparatus as defined by claim 11 wherein said means for accumulating groups of N successive binary bits and for reading out accumulated groups of binary bits comprises a serial-in-parallel-out shift register, and counter means synchronized with the clock rate for enabling read out of said shift register.

14. Apparatus as defined by claim 13 wherein said means for reading out further comprises a parallel-in-parallel-out buffer register coupled to said shift register.

15. For use in conjunction with apparatus for generating video signals which represent fields of scanlines and in conjunction with computer apparatus for receiving digital words of predetermined length; conversion apparatus for receiving the video signals and generating sequences of digital words representative of said video signals and suitable for receipt by the computer apparatus, comprising:

clock means having a rate synchronized with the scanlines of the video signals;

means for comparing, at the clock rate, the video signal level with a reference level, and for generating a binary bit as a function of each comparison;

means synchronized with said clock rate for serially accumulating a group of N successive binary bits; and means for reading out, in parallel and as a single N-bit digital word, each such accumulated group of binary bits.

16. Apparatus as defined by claim 15 further comprising means for detecting the nature of said binary bits over a given period of at least one field; and means responsive to said detection for modifying the reference level.

17. Apparatus as defined by claim 15 wherein said means for accumulating groups of N successive binary bits and for reading out accumulated groups of binary bits comprises a serial-in-parallel-out shift register, and counter means synchronized with the clock rate for enabling read out of said shift register.

18. Apparatus as defined by claim 17 wherein said means for reading out further comprises a parallel-in-parallel-out buffer register coupled to said shift register.

* * * * *

UNITED STATES PATENT AND TRADEMARK OFFICE
CERTIFICATE OF CORRECTION

PATENT NO. : 4,158,856
DATED : June 19, 1979
INVENTOR(S) : Billy J. Tucker

It is certified that error appears in the above-identified patent and that said Letters Patent are hereby corrected as shown below:

Column 6, line 14, "21C" should read — 20C —.

Claim 11, column 8, line 2, delete "words".

In the Drawing Figures:

Fig. 1, the line from computer 20 to comparator 60 should be labelled — 20A —.

Fig. 1, the line from clock 30 to register 70 should be labelled — 30A —.

Signed and Sealed this

Seventh Day of September 1982

[SEAL]

Attest:

GERALD J. MOSSINGHOFF

Attesting Officer    Commissioner of Patents and Trademarks